United States Patent [19]

Gerstenmaier et al.

[11] 4,131,216

[45] Dec. 26, 1978

[54] LEAK DETECTION SYSTEM AND METHOD FOR FLUID DELIVERY PIPING

[75] Inventors: William J. Gerstenmaier; John A. Todd, both of Salisbury, Md.

[73] Assignee: Dresser Industries, Inc., Dallas, Tex.

[21] Appl. No.: 791,812

[22] Filed: Apr. 28, 1977

[51] Int. Cl.² .............................................. B67D 5/14
[52] U.S. Cl. .................................................... 222/52
[58] Field of Search ........................... 222/52; 285/13; 73/40.5 R; 137/551, 557, 559

[56] References Cited

U.S. PATENT DOCUMENTS 3,969,923  7/1976  Howell ............................. 73/40.5 R Primary Examiner—Stanley H. Tollberg Attorney, Agent, or Firm—Daniel Rubin

[57] ABSTRACT

A system and method for detecting leaks in an underground piping network supplying liquid petroleum products pumped from an underground storage tank to an aboveground dispenser outlet. A highly sensitive flow detector situated in a parallel looped bypass arrangement is selectively operated for ascertaining existence or non-existence of a piping leak. Following a sufficient time lapse of non-dispensing for enabling temperature stabilization of the piping network to occur, the detector is actuated in a controlled sequence of go, no-go steps that culminates in ascertaining existence or non-existence of a piping leak while at the same time eliminating any false indication occasioned by detector malfunction.

14 Claims, 9 Drawing Figures

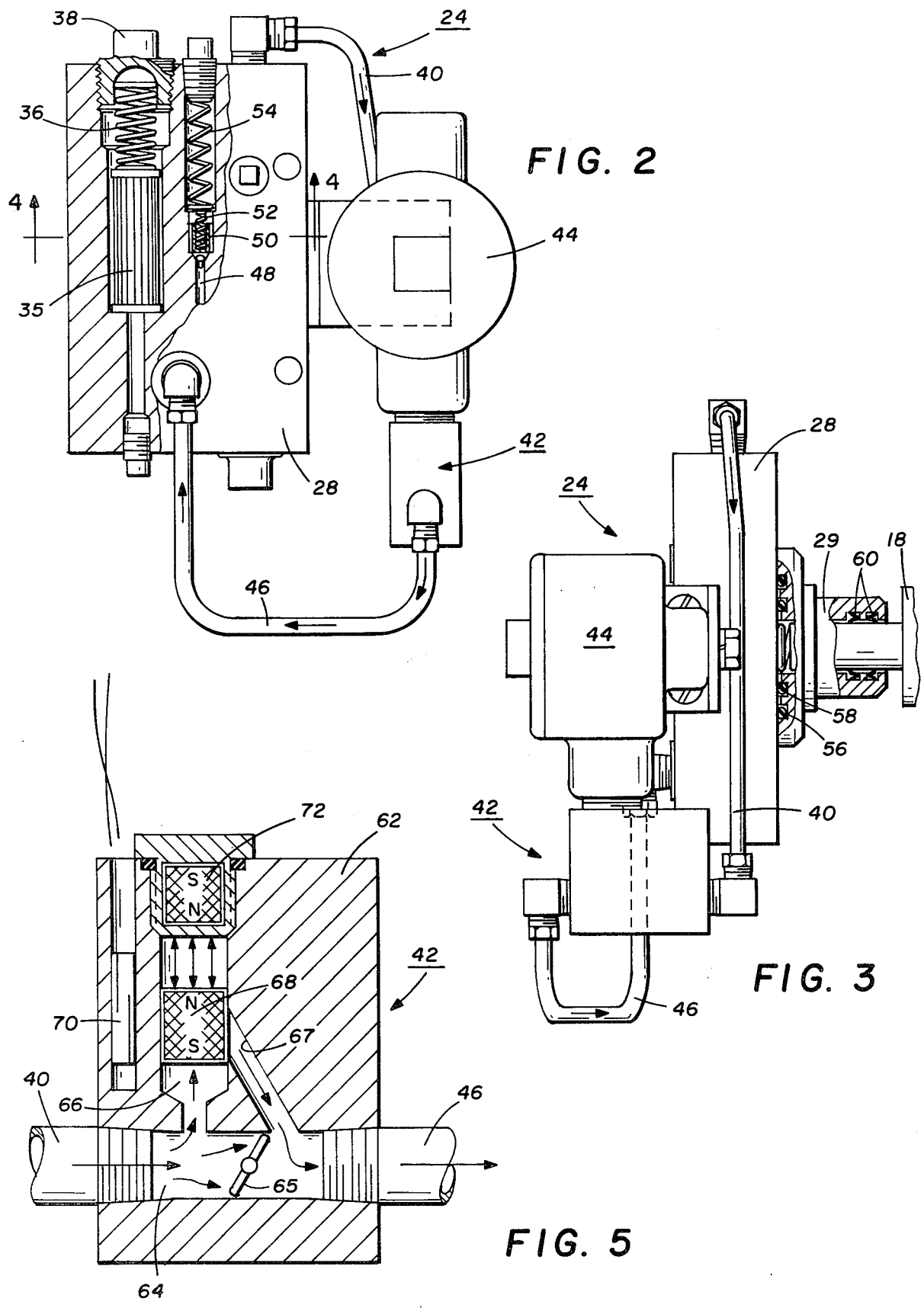

LEAK DETECTION SYSTEM AND METHOD FOR FLUID DELIVERY PIPING

CROSS REFERENCE TO RELATED APPLICATIONS

None.

BACKGROUND OF THE INVENTION a. The field of art to which the invention pertains comprises the art of liquid dispensing and leak testing therefor.

b. It is recognized that even minimal pipe leakage of a fluid commodity being transmitted in underground distribution piping represents an accumulative economic loss that is preferably to be avoided. At the same time, where the leaking fluid is characterized as being toxic, combustible or having other properties requiring controlled containment, its free uncontrolled existence in the escaping environment can pose serious hazards to health and/or safety.

Typically confronted with such problems of underground leakage is the gasoline service station at which petroleum products, principally gasoline, are pumped significant distances from an underground storage tank to the aboveground dispenser from which a customer acquires his automobile fuel needs. Should a leak occur in the delivery piping, it can frequently go undetected until long after its accumulated ground saturation reaches hazardous proportions. For that reason, in conjunction with the current trend toward higher fuel costs, along with current emphasis on increased energy conservation, the need to ascertain existence of leaks in the piping network on a regular basis has become even more of a necessity than ever before. It is important, therefore, that leak detection equipment for that purpose not only be available but that it be available at a nonprohibitive cost and with ease of operation for the service station proprietor. One such system and method is disclosed in U.S. Pat. No. 3,940,020.

SUMMARY OF THE INVENTION

The invention relates to a leak detector system and method for detecting a leak in fluid delivery piping. More specifically, the invention relates to such a system and method particularly adapted as a permanent installation either for original construction or as a retrofit addition to gasoline service stations whereby piping leaks can be readily and reliably ascertained on a regular basis without the prohibitive costs and/or complexity frequently associated with such equipment. This is achieved in accordance herewith by use of a relatively small diameter bypass parallel connected downstream of the pump supplying gasoline from an underground storage tank to one or more of the remotely located aboveground dispensers on the station site. Situated in the bypass is a highly sensitive commercially available flow detector which in the testing cycle is serially energized in a predetermined sequence of go, no-go steps for ascertaining existence or non-existence of a pipe leak. Initiating the actual test cycle is delayed until after a minimum predetermined time period following shutdown of the dispensing system has elapsed to permit temperature stabilization of the piping network. The test is conducted with the dispensers inoperative and on completion of the final step, existence or non-existence of a leak is identified. At the same time, the intermediate test steps serve to eliminate false indication of leakage as might be occasioned by detector malfunction.

It is therefore an object of the invention to provide a novel system for detecting existence of a leak in fluid delivery piping.

It is a further object of the invention to provide a novel method for detecting existence of a leak in fluid delivery piping.

It is a further object of the invention to provide a system and/or method as in the previous objects that will eliminate false leak indications occasioned by malfunction of system components.

It is a further object of the invention to effect the foregoing objects in an underground piping network on the site of a gasoline service station delivering gasoline pumped from an underground storage tank to remotely located aboveground dispenser outlets.

It is a still further object of the invention to effect the last recited object by an installation permanently situated on the site and without prohibitive capital expenditures as compared to previous installations.

BRIEF DESCRIPTION OF THE DRAWINGS

FIG. 2 is a plan view partially sectioned of the leak detector assembly;

FIG. 3 is a side elevation partially sectioned of the leak detector assembly of FIG. 2;

FIG. 5 is a sectional elevation of the flow detector unit utilized in the assembly of FIGS. 2–4;

Figure 1:
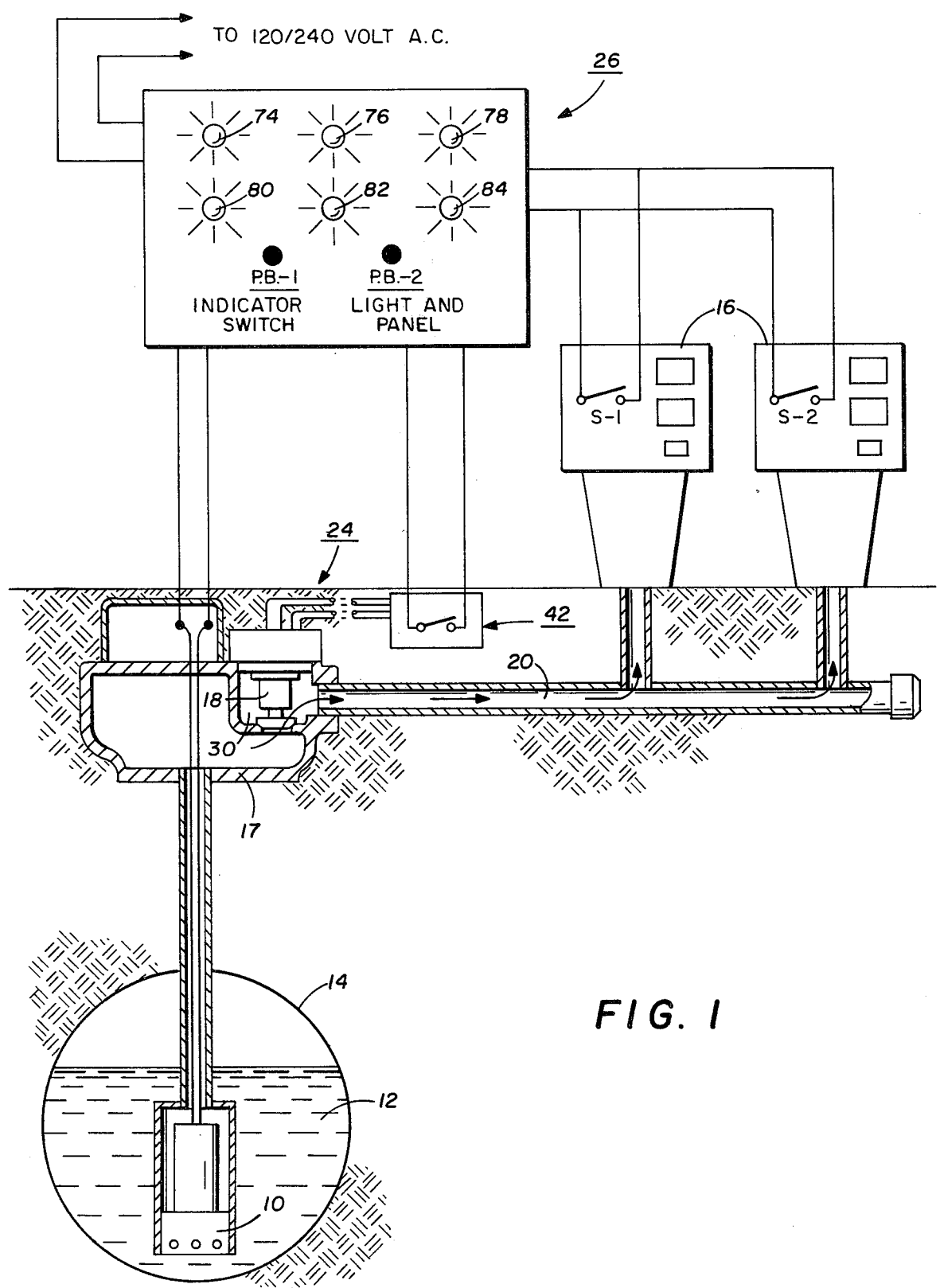
FIG. 1 is a schematic illustration of a gasoline dispensing installation of a type utilizing the leak detection system and method of the invention.
Figure 4:
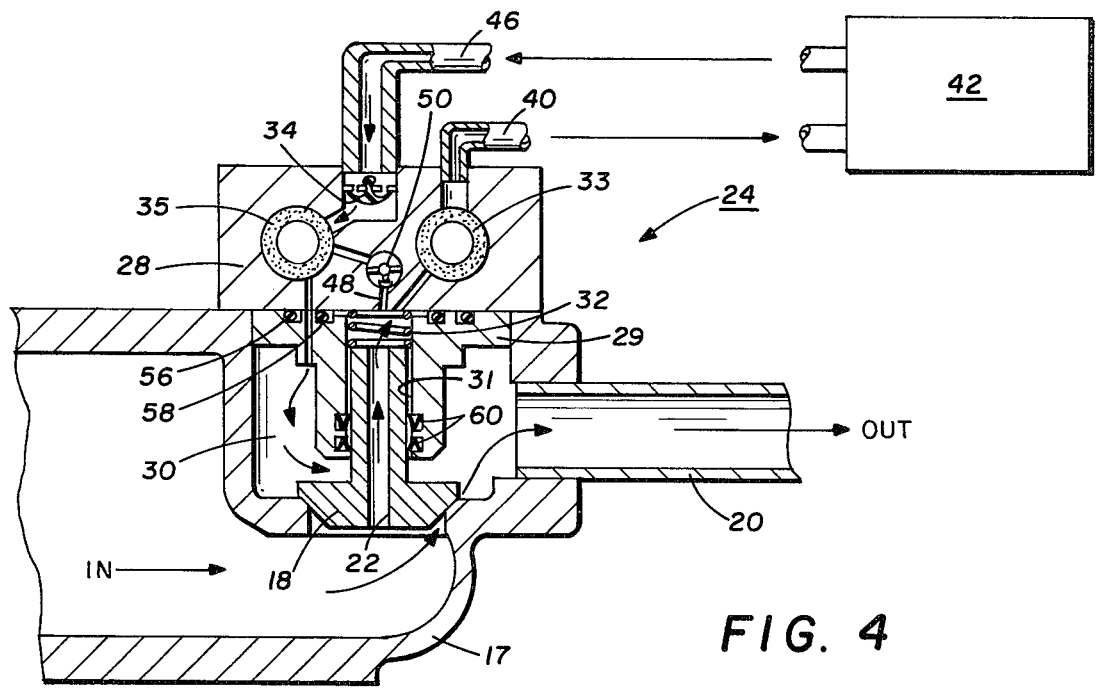
FIG. 4 is a sectional elevation taken substantially along the lines 4—4 of FIG. 3.
Figure 7:
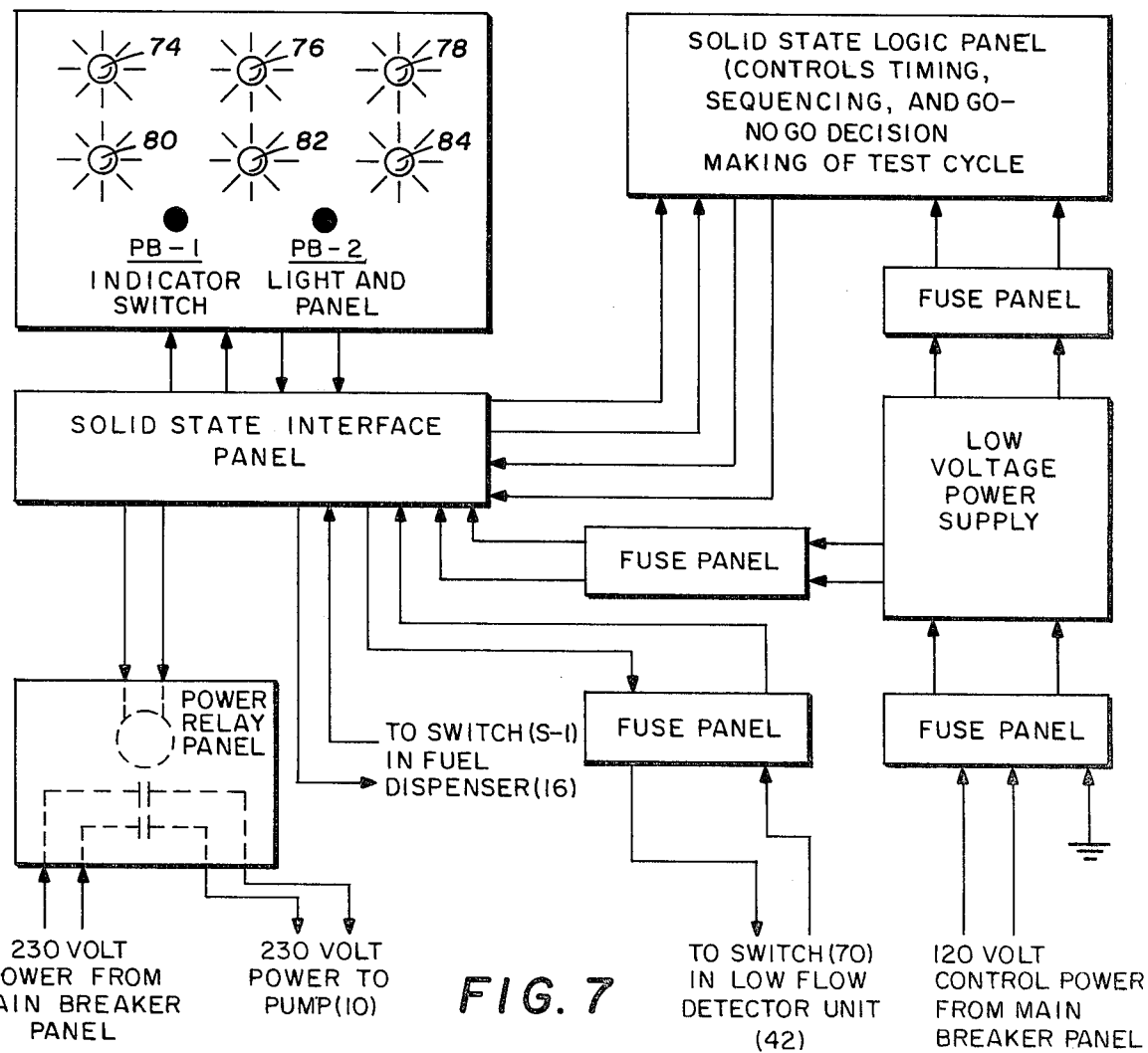
FIG. 7 is an electrical block diagram for the system hereof.
Figure 6A:
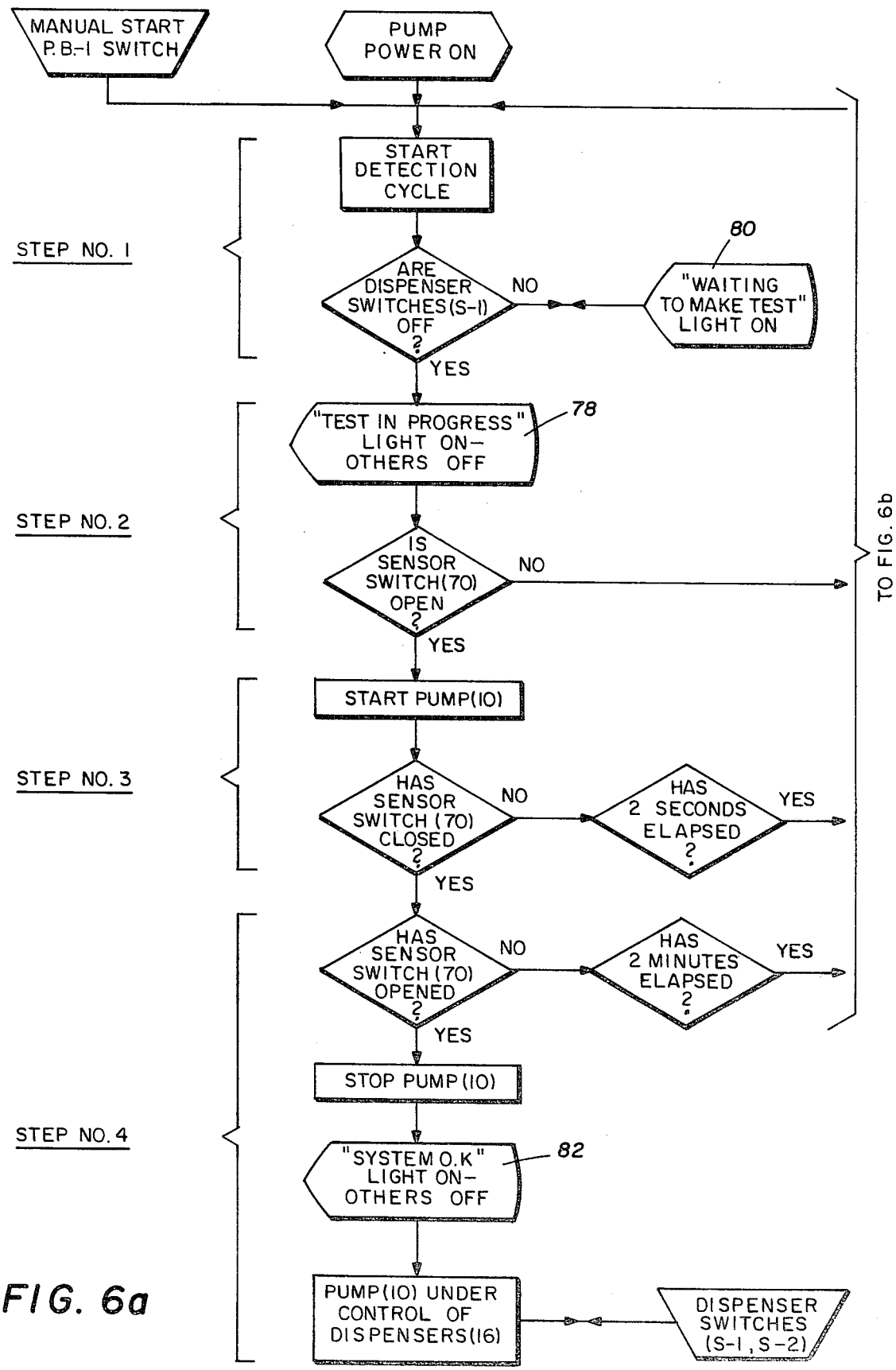
FIG. 6 is a schematic flow diagram illustrating the method of the invention.
Figure 6B:
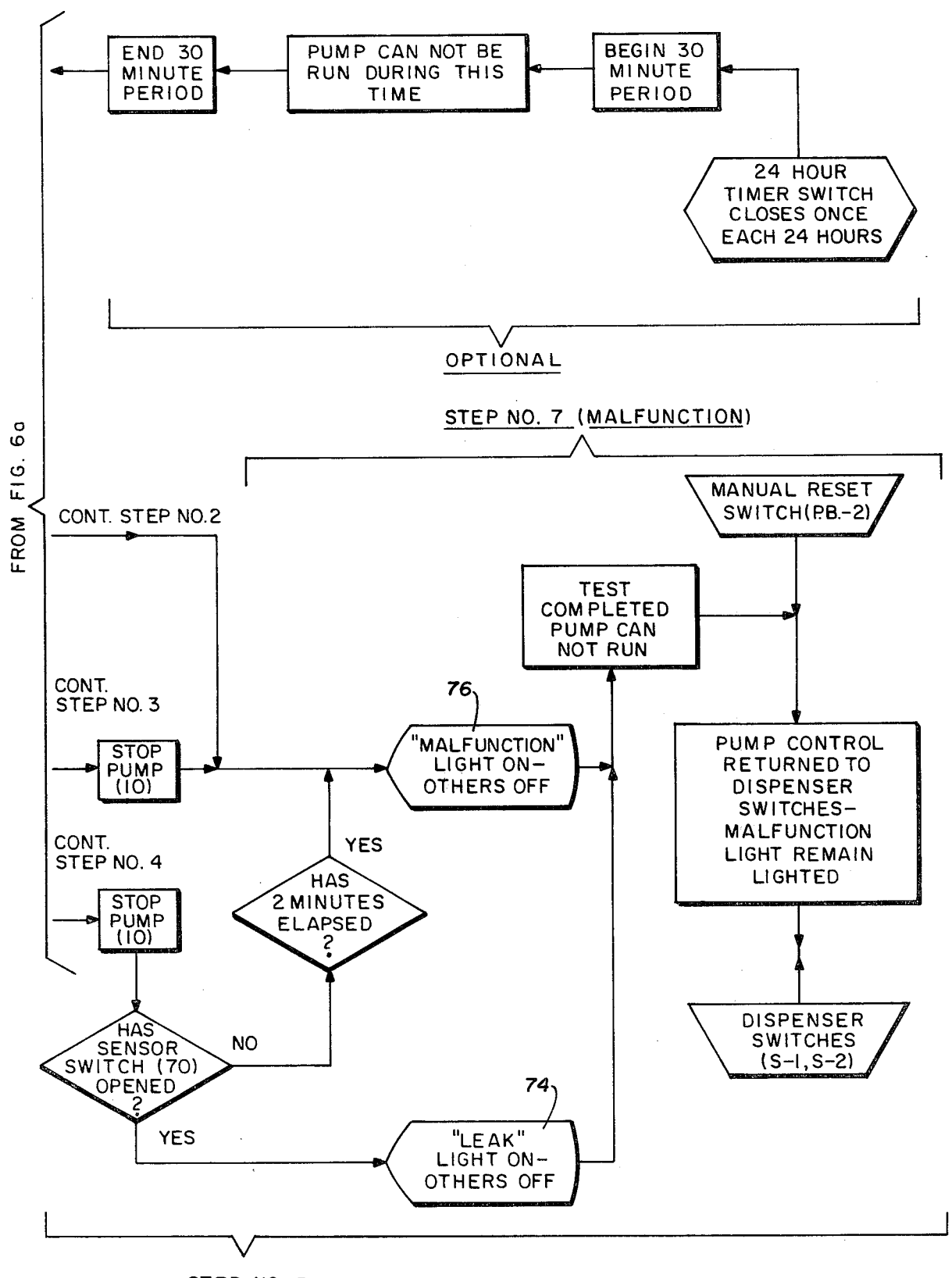

Referring initially to FIG. 1 of the drawings, the system hereof is comprised of a pump 10 submerged beneath the liquid level of gasoline 12 contained in underground storage tank 14. Pump 10 is normally actuated in conjunction with operation of one or more of a plurality of aboveground dispensers 16. Stored gasoline in tank 14 is pumped upward in pump housing 17 past check valve 18 through conduit piping 20 to dispensers 16 for external delivery in a well known manner. For purposes of detecting a leak anywhere in the network of piping 20, check valve 18 is centrally bored at 22 (FIG. 4) for defining a comparatively small diameter bypass leading to a leak detector assembly 24. Operation of the leak detector assembly, to be described, is by means of a control board 26 contained in the kiosk or other suitable location on the station site.

As shown in the preferred embodiment of FIGS. 2–7, detector assembly 24 is in a form particularly adapted for installation as original equipment. Where pump housing 17 is of a type shown, the detector assembly can also be inserted as a retrofit unit into existing facilities. For a non-conforming housing 17 a suitable bypass can be provided.

Comprising detector assembly 24 is a metal housing situated secured to the topside of pump housing 17. Supported on the underside of housing 28 depending into pump well 30 is a guide 29 defining a central bore 31 and sealed against the housing by means of O-rings 56 and 58. Check valve 18 is slideably received in bore 31 where it moves upward in response to pump pressure in opposition to the closing force of spring 32. Concentric packing rings 60 maintain a comparatively leak-tight relation with check valve 18 during the open position in which the main pump discharge is delivered into conduit 20.

Fluid entering bypass bore 22 in check valve 18 is exposed through conduit 48 to relief valve 50 held closed by series arranged springs 52 and 54. Simultaneously, flow enters spring biased inlet filter 33 before exiting through conduit 40 to flow detector 42 to be described. Conduit 46 carries flow from detector 42 past elastomeric check valve 34 to outlet filter 35 secured in position by a coil spring 36 compressed at its topside by a recessed plug 38. From filter 35, the by-passed flow re-enters well 30 to join the main flow discharge through conduit 20. Electrical power for energizing the flow detector is supplied via a junction box 44.

Flow detector 42, as best seen in FIG. 5, is a commercially available unit and in a preferred embodiment is a Model 400 S2HF having an operating capacity of about 8 to 800 cc/min. as manufactured by the Velcor Engineering Corp. of Kenilworth, New Jersey. Briefly, the detector includes a housing 62 in which flow received via tube 40 enters passage 64. A manually settable control vane 65 located downstream in passage 64 shunts flow to bypass inlet 66 adapted to communicate with bypass outlet 67. Contained within inlet 66 is a free moving magnet piston 68 that is effective when moved to open and close reed switch 70.

With no flow present, magnet piston 68 rests near the bottom of passage bore 66 and when flow is established is forced upward by the forces of flow against opposing magnetic forces emitted from stationary magnet 72. Raising magnet 68 in this manner closes switch 70 whereas downward movement restores switch 70 to its open relation. The opposing magnetic forces imposed between magnets 68 and 72 assist in overcoming any small hysteresis effect as might otherwise occur while minimizing pressure differential for switch actuation.

To operate a test cycle for ascertaining existence or nonexistence of a leak in the underground piping system, control board 26 includes six indicator lamps, namely red light 74 imprinted "Danger, gasoline leak"; amber light 76 imprinted "Warning, leak detector malfunctioned"; amber light 78 imprinted "Test in progress"; red light 80 imprinted "Test to begin when dispensers are off"; green light 82 imprinted "System OK"; and amber light 84 imprinted "1 amp fuse — replace when lit". A pushbutton PB-1 is labeled "Push to start leak test" and PB-2 enables reset as will be explained.

For accurate readout of the test results, it is preferable that the piping network be leak checked under relatively stable temperature conditions and for that reason it is recommended as a preliminary first step that at least thirty minutes elapse following the last operation of any dispenser 16 before beginning the test cycle. In order to avoid interruptions that may occur during operating hours, it is deemed preferable as a routine matter when appropriate to conduct the test cycle before morning startup after overnight shutdown and can be initiated automatically when pump and control power is turned on in the morning. While some small amounts of air may be trapped in dead end pipe runs, stub line, horizontal pockets, etc. they will not affect accuracy of the system, as will be understood, when the piping has normally been full of fluid for several hours, and all parts of the system are at a stable temperature. A normal test cycle is conducted in the following steps:

1. The cycle is begun either automatically as aforesaid or if a 24-hour station or the like by depressing PB-1 causing red light 80 to be illuminated with the message "Test to begin when dispensers are off". With dispensers 16 shutdown and the nozzle switches of dispensers 16 S-1, S-2, etc. deactivated, the cycle continues by illuminating amber light 78 containing the message "Test in progress".

2. At this step reed switch 70 on detector 42 is tested by energizing its contacts. With pump 10 inoperative and pump pressure at zero, no flow should be indicated. Finding switch 70 open enables proceeding to the subsequent step whereas finding switch 70 closed causes malfunction light 76 to be illuminated. Under the latter conditions, the test cycle is discontinued until the malfunction has been corrected.

3. At this step pump 10 is energized and switch 70 is tested again. The pressure surge of gasoline 12 being pumped into the line accompanied by a small flow into pipeline bypass 22 should cause signal switch 70 to close. Failure of switch 70 to close would cause malfunction light 76 to be illuminated.

4. During this step pump 10 continues running thereby maintaining lines 20 and 22 under constant pressure. After about a two minute operating period sufficient to allow equalization of pressure in the system switch 70 is again checked. In the absence of a leak, flow through detector 24 should drop to zero and switch 70 should open whereas a leak will cause flow to occur keeping switch 70 closed. If no leak, the switch opens before the two minute period is over and the cycle is completed by illuminating green "system OK" light 82.

Should no leak be indicated, the test is concluded and the control board components will remain at the condition of step 4 until beginning of the next test cycle. Dispensers 16 and pump 10 can then be operated in a normal manner. Total time consumed by the complete test is usually about two minutes maximum with an average estimated time of well under one minute. Should possibility of a leak be indicated by switch 70 remaining closed in step 4, the test cycle proceeds to step 5 for verifying operation of detector 24.

5. Pump 10 is turned off and after a two minute waiting period, switch 70 is again checked. If switch 70 remains closed, malfunction of detector 24 is indicated whereas if open, a leak in the system is positively indicated by confirming that the leak indication of step 4 was accurate and not caused by detector malfunction. This causes leak light 74 to be illuminated and prevents further operation of pump 10 and dispensers 16 until the leak condition is corrected.

If at any time during the test cycle a dispenser switch S-1, S-2 is actuated, the cycle immediately reverts to step 1 and the cycle remains dormant until after the dispenser is inactivated. At that time the cycle is subjected to the preliminary waiting period before the test can be restarted. While in this phase, red light 80 continues to be illuminated. This serves to remind the attendant that dispensers 16 must be kept off during a leak test.

An option for twenty-four hour operating stations is a pair of timers (not shown). One timer is set to begin a test at some predetermined time each day and it starts the second timer which causes pump 10 to be deenergized for thirty minutes. At the end of this period, a leak test is made as above. A timer override switch (not shown) allows pump 10 to run if necessary. However, on turning off the pump, the preliminary waiting period is reinstituted.

If set for automatic test cycle on morning startup, a power failure occurring during the day could cause an unwanted test to be initiated. Unwanted tests are eliminated by a three minute delay in the circuit since most power interruptions are normally of shorter than three minute duration and will therefore be ignored by the system.

By the above description there is disclosed a novel system and method for leak detection in fluid delivery piping. Being particularly adapted for gasoline service stations and the like enables a leak to be easily detected in the underground piping in a relatively inexpensive manner and is adapted for either new constructions or as a retrofit on pre-existing installations. For the latter, it is necessary only to effect a bypass arrangement 22 for installation of detector assembly 24 with a control board 26 at a location convenient for operation by the station attendant. By means of a highly sensitive flow detector 42 situated in the bypass piping it can be selectively operated via the control board in a sequence of series conducted go, no-go steps for ascertaining existence or non-existence of a piping leak. Since the entire cycle can be performed in a minimum time period on the order of less than four minutes, the system readily lends itself to a daily routine before morning startup. Being conducted on a daily basis minimizes the problems and hazards of a system leak since the leak can be promptly detected enabling necessary corrective measures to be performed without prolonged delays as have occurred previously. Not only are the hazards as might otherwise occur substantially minimized thereby, but the cost in commodity loss is likewise minimized as compared to such installations in which detection convenience is not similarly available.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a fluid delivery installation including a fluid source, at least one fluid dispensing outlet, fluid supply piping connecting said fluid source with said dispensing outlet, and a pump capable of being selectively operative for supplying fluid under pressure from said source through said connecting piping to said dispenser outlet, a leak detector system for ascertaining existence of a fluid leak in said installation and comprising in combination:
   a) bypass piping connected in parallel with at least a portion of said fluid supply piping;
   b) a flow detector situated in said bypass piping and capable of being electrically energized for detecting existence of fluid flow in said bypass piping; and
   c) control means to serially energize said flow detector in a predetermined sequence of go, no-go steps for ascertaining existence of a pipe leak.

2. In a fluid delivery installation according to claim 1 in which said control means actuates said pump into pumping relation concomitantly with the conduct of at least one of said steps.

3. In a fluid delivery installation according to claim 2 in which a no-go response to at least one of said steps reflects a malfunction of said flow detector and said control means is responsive to a no-go stop signal to operatively disconnect said pump and said dispenser.

4. In a fluid delivery installation according to claim 2 in which the first step of said control means comprises delaying the subsequent step until after a predetermined minimum time period has elapsed following the last dispensing operation of said dispensing outlet.

5. In a fluid delivery installation according to claim 4 in which said flow detector comprises a flow switch that closes in response to a detected fluid flow therein and said control means is operative for deducing existence of leakage flow by said serial energization of said flow detector.

6. A leak detector system for ascertaining existence of a fluid leak in a fluid delivery installation supplying fluid pumped from a source through supply piping to a dispensing outlet, and comprising in combination:
   a) bypass piping connected in parallel with at least a portion of the fluid supply piping;
   b) a flow detector for situating in said bypass piping and capable of being electrically energized for detecting existence of fluid flow in said bypass piping; and
   c) control means to serially energize said flow detector in a predetermined sequence of go, no-go steps for ascertaining existence of a pipe leak in the delivery installation.

7. A leak detector system according to claim 6 in which said control means functions to actuate the pumping relation of the fluid supply concomitantly with conducting of at least one of said steps.

8. A leak detector system according to claim 7 in which a no-go response to at least one of said steps reflects a malfunction of said flow detector.

9. A leak detector system according to claim 8 in which said flow detector comprises a flow switch that closes in response to a detected fluid flow therein and said control means is operative for deducing existence of leakage flow by said serial energization of said flow detector.

10. A method of detecting a leak in a fluid delivery installation that includes fluid delivery piping connecting a fluid source with a fluid dispensing outlet and a pump capable of being selectively activated for supplying fluid under pressure from the source through the delivery piping to the dispenser, said method comprising the steps of providing a bypass connection in parallel flow relation to at least a portion of the delivery piping, and in the absence of fluid being dispensed by the installation performing a test for ascertaining existence of fluid flow in said bypass connection by a predetermined test cycle comprised of a plurality of sequentially conducted go, no-go steps.

11. A method of detecting a leak according to claim 10 in which the first of said test cycle steps comprises delaying the subsequent step until after a predetermined minimum time period has elapsed following the last dispensing operation of the dispensing outlet.

12. A method of detecting a leak according to claim 11 in which said test cycle steps include the energizing and de-energizing of a flow detector switch in said bypass connection in a controlled go, no-go sequence.

13. A method of detecting a leak according to claim 13 in which at least one of said steps also includes activating said pump.

14. A method of detecting a leak according to claim 13 in which the fluid delivery installation comprises a gasoline dispensing site for dispensing gasoline from an underground storage tank and said steps are operative for detecting a leak in at least the underground portion of said installation.

* * * * *